G. L. ANDERS,

Assignor to C. WILLIAMS, Jr.

Magneto Electric Call Apparatus.

No. 9,677. Reissued April 19, 1881.

*Witnesses.*

W. P. Reid

J. M. Kennedy

*Inventor,*

George L. Anders by Wright & Brown

Attys.

N. PETERS. Photo-Lithographer, Washington, D. C.

UNITED STATES PATENT OFFICE.

GEORGE L. ANDERS, OF BOSTON, ASSIGNOR TO CHARLES WILLIAMS, JR., OF SOMERVILLE, MASSACHUSETTS.

MAGNETO-ELECTRIC CALL APPARATUS.

SPECIFICATION forming part of Reissued Letters Patent No. 9,677, dated April 19, 1881.

Original No. 217,849, dated July 29, 1879. Application for reissue filed September 10, 1880.

*To all whom it may concern:*

Be it known that I, GEORGE LEE ANDERS, of Boston, county of Suffolk, and State of Massachusetts, have invented certain Improvements in Magneto-Electric Call Apparatus, of which the following is a specification.

This invention relates to magneto-generators for operating telephone and other signals.

The object of the invention is to provide certain improvements whereby the operation of the generator is rendered comparatively noiseless, the wear of operating mechanism is automatically compensated for, and the durability of the apparatus in certain particulars is increased.

To these ends my invention consists in the provision of a friction-gear as a means for rotating the armature of a magneto-generator, and also in the provision of means whereby the two wheels composing the friction-gear are held together with a yielding pressure at their point of contact, all of which I will now proceed to describe.

Figure 1:
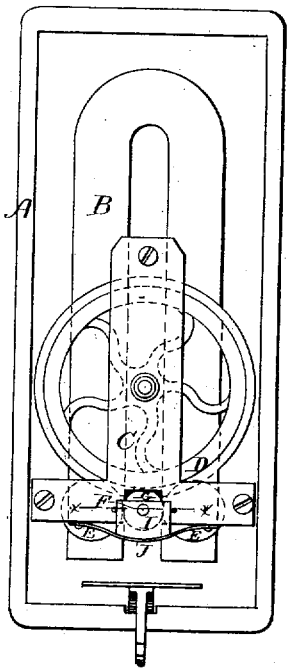
Figure 2:
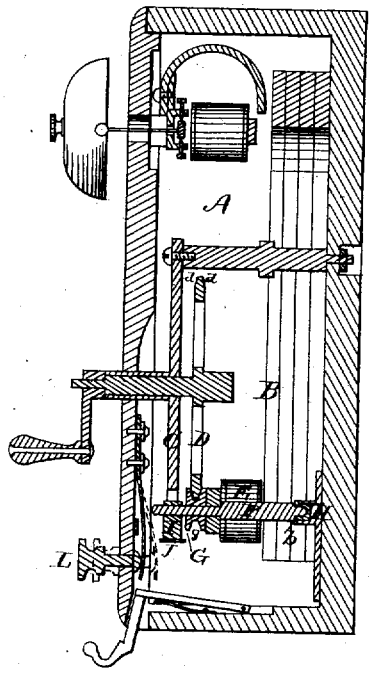
Figure 3:
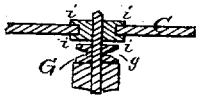
Figure 4:
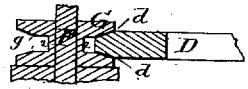

Of the accompanying drawings, forming a part of this specification, Figure 1 represents a top view of a generator embodying my invention, the cover being removed. Fig. 2 represents a longitudinal section, showing the cover in place. Fig. 3 represents a section on line *x x*, Fig. 1. Fig. 4 represents an enlarged sectional view of parts detached.

Similar letters of reference indicate like parts in all of the figures.

In the drawings, A represents the casing of the generator, adapted to be attached to a wall or other support.

B represents the horseshoe-magnet located on the casing.

C represents a metallic plate, rigidly attached to the casing at a suitable distance outside of the magnet, to permit the armature and mechanism for rotating the same to be interposed between the plate and the magnet.

D G represent the two wheels of a friction-gear for rotating the armature of the magnet B. The wheel D is journaled in a sleeve or bearing supported by the plate C, and provided with a crank projecting outside of the casing A. The sides of the wheel D are beveled next to its perimeter, as shown at *d d*.

E represents the rotary armature, located in the usual relation to the poles of the magnet. The armature is located on a metallic axis, F, which is parallel with the axis of the wheel D. The wheel G of the friction-gearing is placed on the axis F, and is adapted to run in frictional contact with the wheel D, and is provided with a groove, *g*, the sides of which are beveled from the perimeter of the pulley to the points 1 1, and are parallel from 1 1 to the inner wall or bottom, 2, of the groove. The beveled sides of the groove correspond to the beveled sides *d* of the wheel D, and the groove is of sufficient width to permit the beveled portion of the wheel D to enter and bear against the beveled sides of the groove until the perimeter of the wheel D projects slightly beyond the beveled portion of the groove. The axis F of the armature is journaled at one end in a step, H, rigidly attached to the casing A, said step being provided with an insulating-bushing, *b*, and at the other end in a bearing-block, I, which is adapted to slide toward and away from the axis of wheel D in a recess in the plate C, said plate constituting a support for the block. This block is composed of vulcanized fiber or other insulating and anti-frictional material and provided with flanges *i i*, projecting over and under the plate C, to prevent the block from moving laterally of said plate.

J represents a spring, which is attached to the end of plate C, or to any suitable support, and bears against block I, forcing the latter toward the wheel D, and maintaining a yielding pressure between the wheel D and the wheel G.

It will be seen that when the wheel D is rotated it will rotate the wheel G and the armature by frictional contact, and with comparatively little noise. The yielding pressure maintained between the wheels of the friction-gearing at their points of contact prevents the slipping of one upon the other, and compensates for the wear of each wheel and for any inequalities in either wheel, keeping each in operative contact with the other at all times. The beveled sides of the wheel and the partially-beveled and partially-parallel sides of the groove *g* enable the groove to always present the same extent of bearing-surface to the wheel, the pulley being forced toward the wheel by its spring as it wears away.

By the application of the described improvements to a magneto-generator I combine the following useful results, viz: simplicity of construction, comparative noiselessness of operation, durability, and the maintenance of working and wearing parts in operative condition.

The outer end of the axis F of the armature projects through the block I, and is within reach of a spring contact-plate, K, attached to the cover of the casing A. This plate is electrically connected to a distant point or points to which currents are to be transmitted, and is provided with a key, L, whereby it may be forced into contact with the end of the arbor F, as shown in dotted lines in Fig. 2, the plate being separated from said arbor by its own resilience. When the armature is being rotated by the operator, a pressure upon the key L will cause the current generated to pass to the distant points or points with which the generator is in connection. This is a very simple and economical arrangement for effecting the result described, the plate K being in contact with the arbor F only when a current is being transmitted, thus avoiding friction and wear, which would result if the rotating arbor were always in contact with the spring, as heretofore, and obviating the use of a circuit-breaking device or switch.

I claim as my invention—

1. The combination of a permanent magnet, a rotary armature, a shaft supporting said armature, a pulley, G, provided with the groove *g* and arranged upon the armature-shaft, and the driving-wheel D, adapted to fit into the groove *g* of said pulley, substantially as and for the purpose described.

2. In a magneto-generator, the combination, with the rotary armature, of a driving-wheel and an automatically-yielding driven wheel in frictional contact with the driving wheel, for rotating said armature, substantially as described.

3. In a magneto-generator, the combination, with the rotary armature, of the axis F, the supported sliding bearing-block I, the spring J, the pulley G, having a partially-beveled groove, *g*, and the driving-wheel D, having beveled sides *d*, all arranged and operating substantially as described.

GEORGE LEE ANDERS.

Witnesses:
C. F. BROWN,
ELLA M. RICE.